United States Patent [19]

Michelotti

[11] 4,445,179

[45] Apr. 24, 1984

[54] AIRCRAFT MINIMUM DRAG SPEED SYSTEM

[76] Inventor: Paul E. Michelotti, P.O. Box 607, 5 Woods Way, Woodbury, Conn. 06798

[21] Appl. No.: 274,731

[22] Filed: Jun. 18, 1981

Related U.S. Application Data

[63] Continuation-in-part of Ser. No. 128,107, Mar. 7, 1980, abandoned.

[51] Int. Cl.³ .............................................. G06F 15/20
[52] U.S. Cl. .................................. 364/431.07; 244/182
[58] Field of Search ............... 364/424, 442, 426, 433, 364/431.07; 244/182

[56] References Cited

U.S. PATENT DOCUMENTS

| | | | |
|---|---|---|---|
| 4,063,072 | 12/1977 | Sochtig | 364/442 X |
| 4,113,046 | 9/1978 | Arpino | 364/442 X |
| 4,159,088 | 6/1979 | Cosley | 364/442 X |
| 4,312,041 | 1/1982 | DeJonge | 364/442 |
| 4,325,123 | 4/1982 | Graham et al. | 364/431.07 |

Primary Examiner—Edward J. Wise
Attorney, Agent, or Firm—Parmelee, Bollinger & Bramblett

[57] ABSTRACT

A method is provided for obtaining minimum aircraft fuel consumption per unit of time by flying at the minimum drag speed. The computation of the minimum drag speed is based on the principle that in an aircraft in level flight with a constant power setting, wherein a differential exists between thrust and drag, the resultant longitudinal acceleration will exhibit an increasing magnitude when the aircraft is below minimum drag speed and a decreasing magnitude when the aircraft is above minimum drag speed. Accordingly, longitudinal accelerations are induced in an aircraft through the use of incremental thrust changes, and the rate of change of said accelerations are compared with airspeed in order to determine the minimum drag speed in accordance with said principle. The aircraft is then maintained at the minimum drag speed which permits it to stay aloft at minimum fuel consumption rates.

2 Claims, 5 Drawing Figures

METHOD OF COMPUTATION

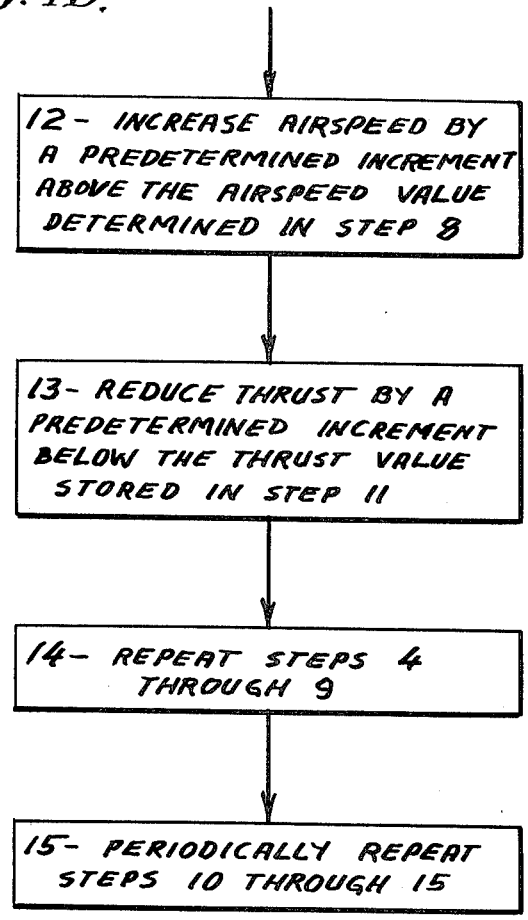

AIRCRAFT MINIMUM DRAG SPEED SYSTEM

BACKGROUND OF THE INVENTION

This application is a continuation-in-part of my copending application Ser. No. 128,107 filed Mar. 7, 1980 now abandoned.

This invention relates to a method for use in an aircraft to determine and maintain minimum drag speed in level flight in order for the aircraft to operate at the most economical air speed in terms of flight time per pound of fuel.

With ever escalating fuel costs, the consumption of fuel during a flight comprises a significant, if not the major, cost of operation of an aircraft. Flight planning charts and performance tables supplied by aircraft manufacturers provide only an approximation of actual aircraft performance in flight. The increasing need for fuel conservation has led to more precise methods of cruise control and performance analysis. For example, in U.S. Pat. No. 4,159,008 a method is provided for obtaining optimum fuel efficiency in terms of nautical air miles traversed per pound of fuel consumed through the comparison of actual fuel flow versus actual ground speed. Optimum efficiency is provided in the climb segment of the flight by comparing aircraft pitch attitude with the rate of climb.

In U.S. Pat. No. 4,063,072, a computer is utilized to analyze the various operating costs of an aircraft in order to provide an airspeed which will result in minimum total flying cost per unit of distance.

With the advent of expanding air travel, aircraft are often required to fly in holding patterns due to limited airport facilities, weather conditions or traffic congestion. On these occasions, it is desirable to operate an aircraft purely in terms of minimum fuel flow without regard to mileage efficiency or other operating costs.

Accordingly, it is an object of the present invention to provide a method for determining and maintaining the aircraft at minimum drag speed during flight in order to obtain minimum fuel consumption per unit of time.

SUMMARY OF THE INVENTION

In carrying out this invention, in one illustrative embodiment thereof, a method is provided for obtaining minimum fuel consumption per unit of time by incrementally changing the aircraft power settings in order to produce longitudinal accelerations in the aircraft. The rate of change and magnitude of the longitudinal accelerations are measured along with the airspeed of the aircraft. The rate of change and magnitude of the longitudinal accelerations of the aircraft are compared with the airspeed for determining the minimum drag speed which corresponds to the airspeed at which the rate of change of acceleration is zero. By maintaining the minimum drag speed for the aircraft, fuel consumption per unit of time is minimized.

Advantageously, in accordance with the present invention, only a thrust parameter of the engine(s), longitudinal acceleration, and airspeed are required as computer inputs in order to determine the minimum drag speed which provides the most economical fuel operation of the aircraft.

BRIEF DESCRIPTION OF THE DRAWINGS

The invention, together with further aspects, objects and advantages thereof, will best be understood from the following description taken in connection with the accompanying drawings wherein:

FIGS. 4A and 4B show, in block diagram form, a method for an embodiment of the invention.

DESCRIPTION OF THE PREFERRED EMBODIMENTS

When Newton's law, force equals mass times acceleration (F=mA), is applied to an aircraft in level flight, the minimum drag speed of the aircraft can be determined by measuring the acceleration of the aircraft at a constant thrust setting. In level, stabilized flight, thrust (T) equals drag (D), as lift equals weight. Also, F=T−D. Thus:

$$T - D = mA$$

Therefore, determining the precise minimum drag speed of an aircraft in flight is achieved in the present invention by measuring longitudinal accelerations which are induced in the aircraft through incremental changes in power setting. An accelerometer is used to measure the magnitude and rate of change of the accelerations. The magnitude and rate of change of the accelerations are compared with the airspeed of the aircraft and the minimum drag speed is computed through logic derived from the aforesaid Newton's law.

Assuming that the aircraft is traveling at an airspeed which is initially below minimum drag speed, if T is increased, as by advancing the throttle setting, D will at first decrease with airspeed as a result of decreased induced drag. However, when past minimum drag speed, total drag will increase as parasitic drag increases. Maximum acceleration will occur at minimum drag:

$$T - D_{min} = mA_{max}$$

In the example, with the aircraft traveling below minimum drag speed when thrust is first increased, it becomes greater than drag, and accordingly, the aircraft accelerates. Acceleration increases to a maximum and then declines to a new stable condition where thrust once more equals drag and there is no acceleration. Minimum drag speed corresponds to the airspeed at which maximum acceleration is achieved under constant thrust. As an alternative way of stating this, minimum drag speed occurs where the rate of change of acceleration equals zero. Accordingly, in level flight with a constant thrust setting, an increasing positive acceleration indicates that the aircraft is below minimum drag speed and approaching it while a decreasing positive acceleration indicates that the aircraft is above minimum drag speed and moving further away.

Another way of expressing the same principle is a comparison of deceleration vs. airspeed where at the start the thrust is less than the actual drag as well as the minimum drag. An increasing negative acceleration indicates that the aircraft is below minimum drag speed and approaching a stalled condition while a decreasing negative acceleration indicates that the aircraft is above minimum drag speed and approaching it.

Figure 1:
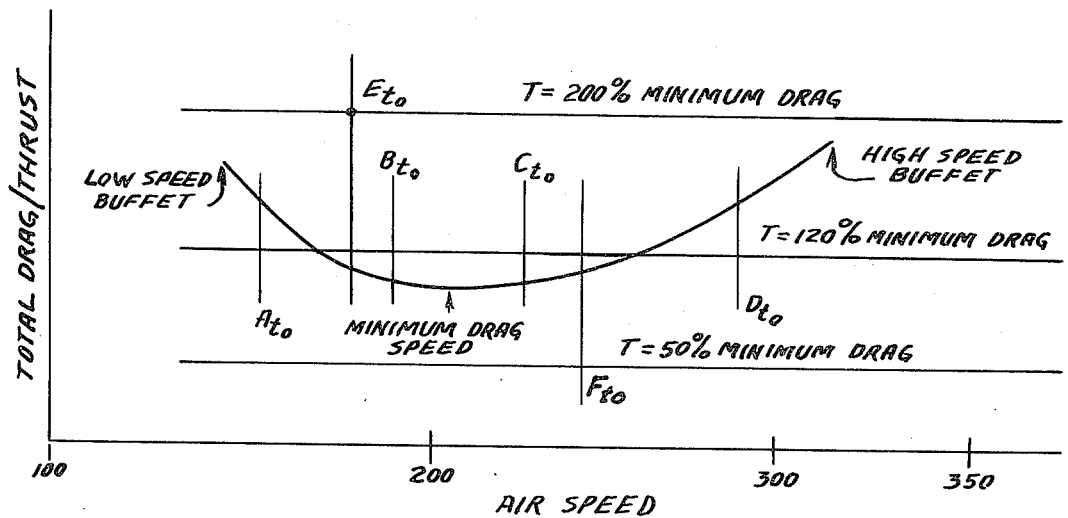
FIG. 1 is a graph of drag and thrust vs. airspeed.
Figure 2:
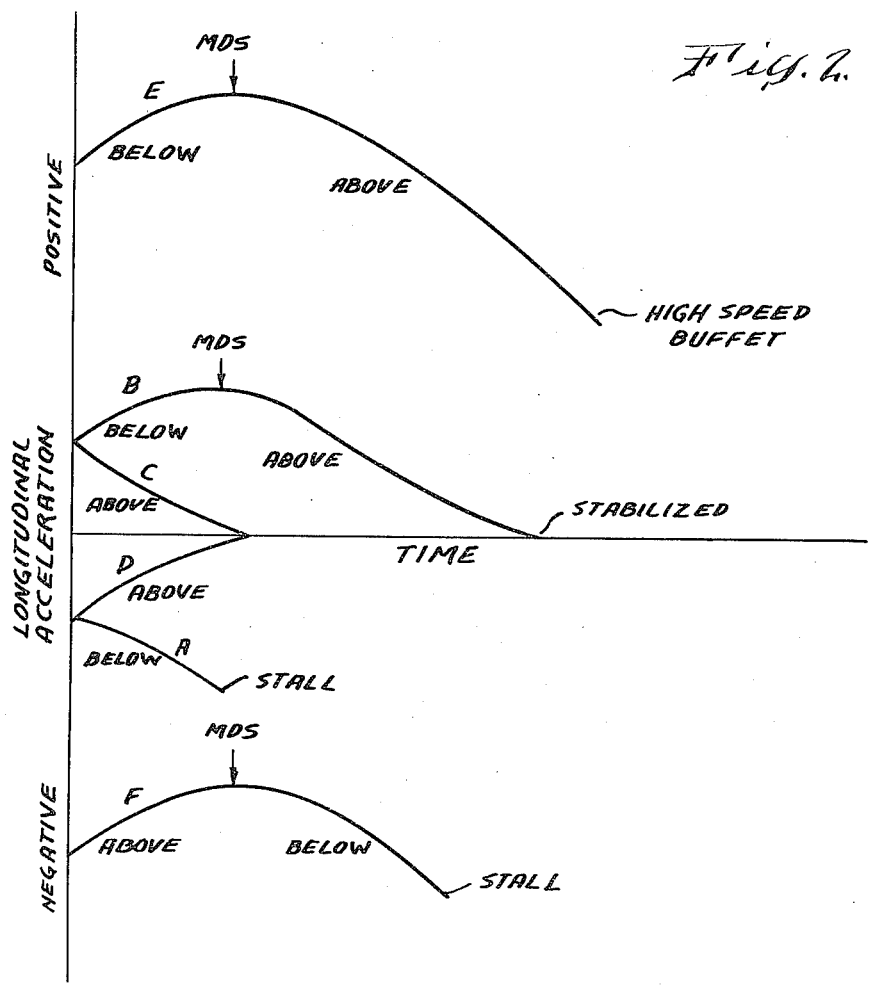
FIG. 2 shows a series of curves of aircraft acceleration vs. time resulting from the initial thrust/drag relationship represented by lettered vertical lines in FIG. 1.

FIGS. 1 and 2 illustrate these principles. FIG. 1 shows the total drag/thrust vs. airspeed for a typical subsonic jet transport at altitude with a minimum drag speed of 205 knots. Vertical line $A_{to}$ represents a condition wherein aircraft speed is 155 knots and thrust is 120% of the minimum total drag. Under this condition, drag exceeds thrust so the aircraft will decelerate at an increasing rate until it stalls. This deceleration is represented by curve A in FIG. 2 which is a plot of acceleration vs. time.

Vertical line $B_{to}$ represents the aircraft at 190 knots with the same power setting as in the previous example, namely thrust equals 120% of minimum drag. In this case, thrust exceeds drag so the aircraft accelerates to a speed of approximately 260 knots which is represented by curve B in FIG. 2. The apex of curve 2 represents the minimum drag speed (MDS). At the minimum drag speed the differential between thrust and drag is at a maximum and acceleration is at a maximum in accordance with the aforesaid Newton's law. It is important to note in these examples that the magnitude of the acceleration increases with the passage of time below minimum drag speed and decreases with time above minimum drag speed.

Other examples of various airspeeds and thrust combinations are represented on FIG. 1 by vertical lines $C_{to}$, $D_{to}$, $E_{to}$ and $F_{to}$ with the resultant accelerations depicted in FIG. 2 by curves C, D, E and F, respectively, having portions labelled as being "above" or "below" minimum drag speed.

Based on the foregoing relationships, the following principle can be stated: "In an aircraft in level flight with a constant power setting, wherein a differential exists between thrust and drag, the resultant longitudinal acceleration will exhibit an increasing magnitude when the aircraft is below minimum drag speed and a decreasing magnitude when the aircraft is above minimum drag speed."

Figure 3:
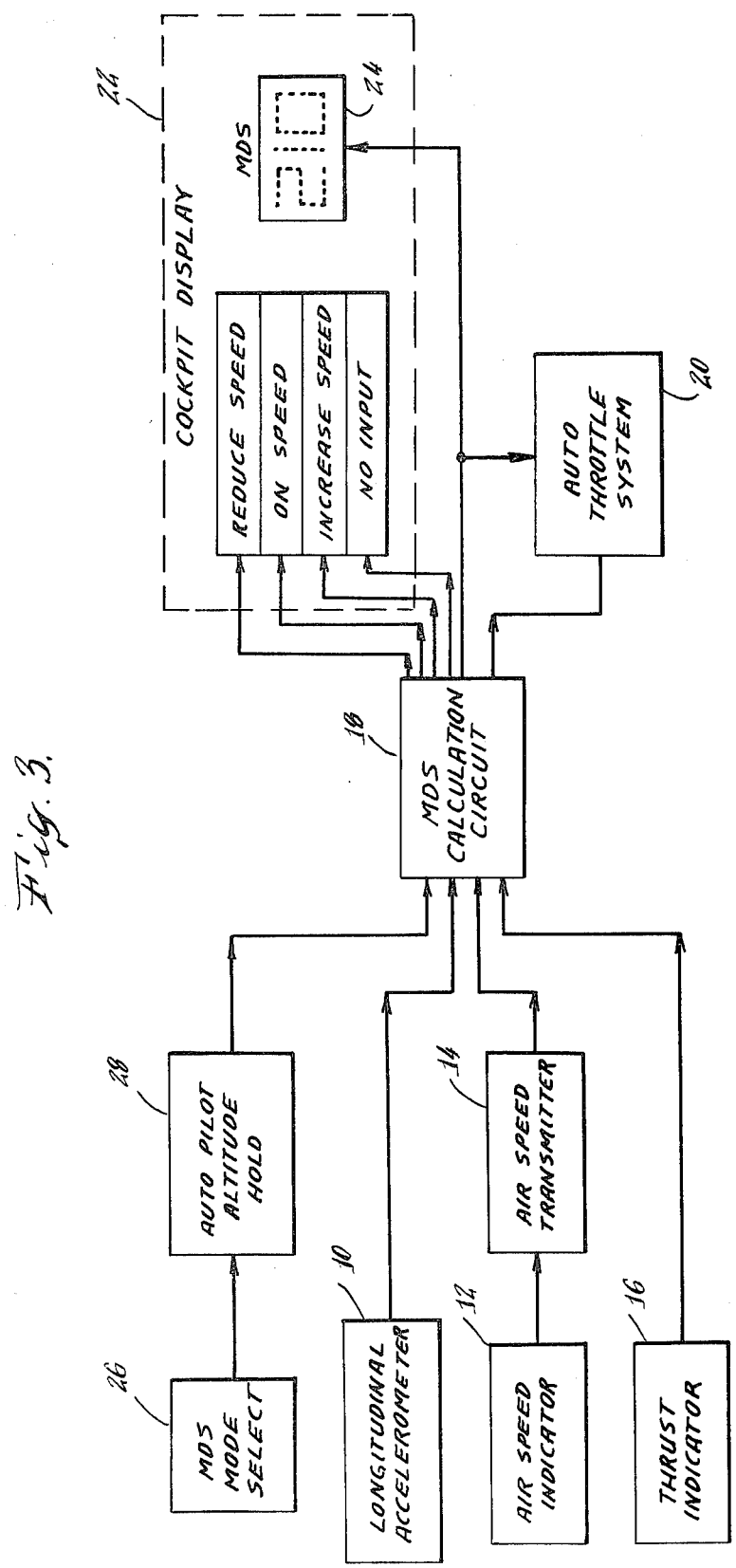
FIG. 3 is a schematic diagram illustrating the control system of the present invention.

The stated principle provides a means which will enable pilots to fly their aircraft at the most economical airspeed in terms of minimum fuel consumption per unit of time. Everything requires is illustrated in FIG. 3 and includes a longitudinal accelerometer 10, an airspeed indicator 12 which is coupled to an airspeed transmitter 14, and a thrust indicator 16, all of which are coupled to a minimum drag speed computer 18 which calculates minimum drag speed in accordance with said principle. The computer 18 may be utilized to automatically control the throttle system 20 or may activate a cockpit display 22 to provide a readout of minimum drag speed 24 along with instructions such as "reduce speed", "on speed", "increase speed" or "no input" which may be consulted by the pilot for manual throttle operaton. This system, as shown in FIG. 3, includes a minimum drag speed mode select 26 which is coupled through autopilot altitude hold 28 to the computer 18 in order to prevent erroneous indications that can occur in conditions other than level flight.

The longitudinal accelerometer 10 is installed along the longitudinal axis of the aircraft and measures the acceleration of the aircraft while the airspeed indicator 12 provides a measurement of airspeed which is transmitted by the airspeed transmitter 14 to the computer 18. In an aircraft having an inertial navigation system (INS), the acceleration signal may be taken from the proper accelerometer in the INS. The accelerometer 10, airspeed indicator 12 and thrust indicator 16 are all coupled to the computer with the thrust parameter being taken from the turbine speed(s) in a jet plane or, in a propeller type plane, from a source such as manifold pressure. The computer 18 senses, stores, and compares acceleration and airspeed values, and the speed at maximum or minimum acceleration as appropriate, or when the rate of change of acceleration equals zero, is the minimum drag speed.

Figure 4A:
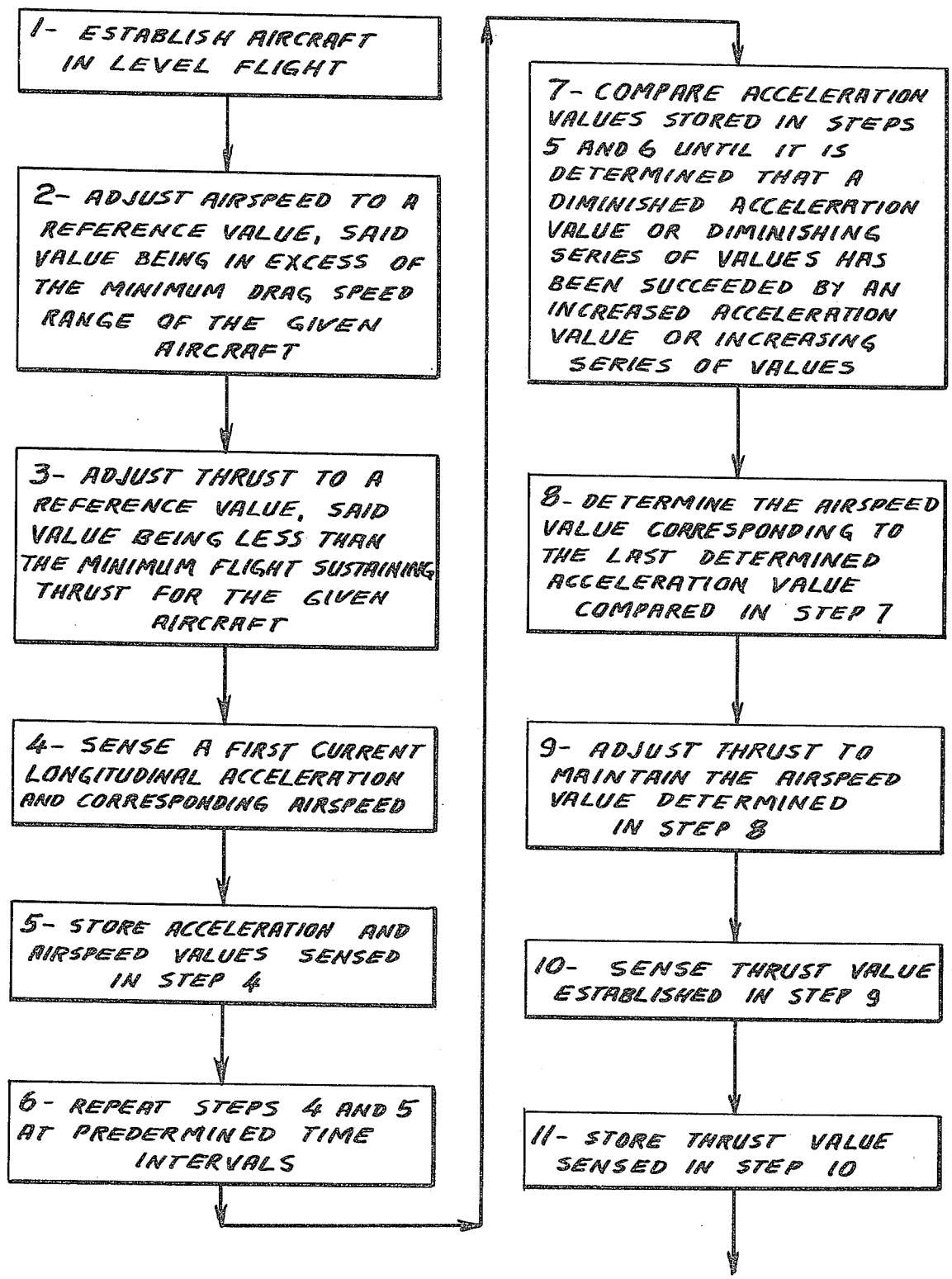

A specific method of computation is shown in FIGS. 4A and 4B.

In Step 1, the aircraft is established in level flight in order to prevent erroneous acceleration readings which could result from changes in altitude or other control inputs. The most advantageous means to achieve level flight is by use of the auto-pilot with altitude hold engaged.

In Step 2, the airspeed is adjusted to a reference value, said value being in excess of the minimum drag speed range of the given aircraft.

In Step 3, the thrust is adjusted to a reference value, said value being less than the minimum thrust required to sustain level flight in the given aircraft.

With the combination of thrust and drag established by Steps 2 and 3, the aircraft will begin to decelerate and said deceleration will carry the aircraft through the actual minimum drag speed and towards a stalled condition. As the aircraft decelerates, acceleration and corresponding airspeed values are periodically sensed and stored as indicated in Steps 4 through 6. The stored acceleration values are also compared, as indicated in Step 7, until it is determined that a diminished acceleration value, or diminishing series of values, has been succeeded by an increased acceleration value, or increasing series of values. The airspeed value corresponding to the point at which diminishing acceleration values change to increasing acceleration values is the minimum drag speed. Step 8 provides for the recall of said airspeed value.

Having established the minimum drag speed of the aircraft, thrust is adjusted to maintain said airspeed as provided in Step 9. The aircraft is now operating at minimum fuel consumption per unit of time.

The minimum drag speed may vary, however, with the passage of time due to changes in weight resulting from fuel consumption, changes in atmospheric conditions, and possibly changes in altitude. Accordingly, it is desirable to periodically recompute the precise value. In doing so, it is also desirable to avoid the rather abrupt thrust and airspeed changes that would occur with reiterations of Steps 2 and 3. Therefore, Steps 10 through 15 are included to allow for periodic recomputation with only incremental changes in thrust and airspeed.

In Step 10 the stabilized thrust value established in Step 9 is sensed and then stored in Step 11. In Step 12, the airspeed is increased by a predetermined increment above the airspeed value determined in Step 8, which is the minimum drag speed. Thrust is then reduced by a predetermined increment below the thrust value stored in Step 11, as provided for in Step 13. Step 14 provides for the repetition of Steps 4 through 9, which is, in effect, a recomputation of the minimum drag speed. Step 15 provides for the periodic repetition of Steps 10 through 15. This final step is the periodic recomputation of minimum drag speed utilizing incremental changes in thrust and airspeed.

Since other changes and modifications varied to fit particular operating requirements and environments will be apparent to those skilled in the art, the invention is not considered limited to the examples chosen for purposes of illustration and covers all changes and modifications which do not constitute a departure from the true spirit and scope of this invention.

What is claimed is:

1. A method for obtaining minimum fuel consumption per unit of time in an operating aircraft in level flight comprising the steps of:

incrementally changing aircraft power settings to produce longitudinal accelerations;

measuring the rates of change of said longitudinal accelerations;

measuring the airspeed of the aircraft;

comparing the rates of change of said longitudinal accelerations and the airspeed; and determining the minimum drag speed as that speed at which the rate of change of longitudinal acceleration is substantially zero.

2. A method for obtaining minimum fuel consumption per unit of time in an operating aircraft in flight, utilizing a computer with a memory and comparator, and input means representing longitudinal acceleration, airspeed, and engine thrust comprising the steps of:

(1) Establishing the aircraft in level flight;

(2) Adjusting airspeed to a reference value, said value being in excess of the minimum drag speed range of the given aircraft;

(3) Adjusting thrust to a reference value, said value being less than the minimum flight sustaining thrust for the given aircraft;

(4) Sensing a first current longitudinal acceleration and corresponding airspeed;

(5) Storing the acceleration and airspeed values sensed in Step 4;

(6) Repeating Steps 4 and 5 at predetermined time intervals;

(7) Comparing acceleration values stored in Steps 5 and 6 until it is determined that a diminished acceleration value or diminishing series of values has been succeeded by an increased acceleration value or increasing series of values;

(8) Determining the airspeed value corresponding to the last diminished acceleration value compared in Step 7;

(9) Adjusting thrust to maintain the airspeed value determined in Step 8;

(10) Sensing the thrust value established in Step 9;

(11) Storing the thrust value sensed in Step 10;

(12) Increasing airspeed by a predetermined increment above the airspeed value determined in Step 8;

(13) Reducing thrust by a predetermined increment below the thrust value stored in Step 11;

(14) Repeating Steps 4 through 9; and

(15) Periodically repeating Steps 10 through 15.

* * * * *